United States Patent
Saitou et al.

[11] Patent Number: 5,698,131
[45] Date of Patent: Dec. 16, 1997

[54] PASTE FOR MANUFACTURING FERRITE AND FERRITE

[75] Inventors: Shinji Saitou, Osaka; Kazuyuki Okano, Nara, both of Japan

[73] Assignee: Matsushita Electric Industrial Co., LTD., Osaka, Japan

[21] Appl. No.: 645,103

[22] Filed: May 13, 1996

[30] Foreign Application Priority Data

May 15, 1995 [JP] Japan ................... 7-116165

[51] Int. Cl.$^6$ .................... C04B 35/36; C04B 35/38; C04B 35/40
[52] U.S. Cl. .................... 252/62.57; 252/62.56; 252/62.61; 252/62.64; 252/62.62; 501/12; 423/594; 428/928; 428/692; 427/128; 427/130
[58] Field of Search .................... 501/12; 252/62.56, 252/62.61, 62.64, 62.62, 62.57; 423/594; 428/697, 928, 692; 427/128, 130

[56] References Cited

U.S. PATENT DOCUMENTS

| | | | |
|---|---|---|---|
| 3,096,206 | 7/1963 | Wade, Jr. | 427/130 |
| 3,418,241 | 12/1968 | Weis | 252/62.58 |

FOREIGN PATENT DOCUMENTS

| | | |
|---|---|---|
| 58-45121 | 3/1983 | Japan . |
| 2-18329 | 1/1990 | Japan . |
| 2-60974 | 3/1990 | Japan . |
| 2-157121 | 6/1990 | Japan . |
| 3-268403 | 11/1991 | Japan . |
| 3-273069 | 12/1991 | Japan . |
| 4-3402 | 1/1992 | Japan . |
| 4-83704 | 3/1992 | Japan . |
| 5-221652 | 8/1993 | Japan . |

OTHER PUBLICATIONS

W. Wade, et al., "Chemically Deposited Thin Ferrite Films", *Journal of Applied Physics*, vol.34, No. 4 (Part 2), Apr. 1963, pp. 1219–1220.

*Primary Examiner*—Melissa Bonner
*Attorney, Agent, or Firm*—Merchant, Gould, Smith, Edell, Welter & Schmidt, P.A.

[57] ABSTRACT

A paste for manufacturing ferrite is produced by dissolving the following materials: organometallic compound comprising a metal element Fe (A); organometallic compound comprising a metal element Me (Me herein denotes at least one element selected from the group consisting of Mn, Li, Mg, Ni, Zn, Y and Gd) (B); and at least one material selected from terpenoid carboxylic acid and resins containing the composition of the terpenoid carboxylic acid (C) in organic solvent (D). The paste permits providing a dense and homogeneous ferrite with a good property. Moreover, the use of such ferrite permits producing ferrite thin films. Furthermore, the ferrite with an excellent high-frequency property can be provided by coating and firing the paste of the present invention. The temperature properties of YIG thin film and Gd-substituted YIG thin film of the present invention are shown.

18 Claims, 2 Drawing Sheets

PASTE FOR MANUFACTURING FERRITE AND FERRITE

FIELD OF THE INVENTION

The invention relates to ferrite used for various electronic parts. More specifically, the invention relates to a paste that is a precursor for forming ferrite comprising an organometallic compound, and moreover relates to the ferrite into which the paste is made.

DESCRIPTION OF THE PRIOR ART

Ferrite for general practical applications is made from such material compounds as metallic oxide, metallic carbonate or other inorganic metal compound by a powder process such as the dry method or the coprecipitation method. Ferrite is a bulk material comprising micron-order crystal grains. Another method for forming thin films from liquid phase includes obtaining ferrite thin films by dissolving metallic nitrate or metallic chloride in organic solvent such as alcohol or the like and then coating and firing the solution. However, the prior powder method has not sufficiently improved a loss at high-frequency, because the particle size during formation was sub-micron order at best. Consequently, ferrite with a high-frequency property has not been obtained. Additionally, the particle size of the ferrite was relatively large so that forming thin films from the ferrite is difficult.

Moreover, according to the above-mentioned prior liquid phase forming method, it was difficult to obtain dense and homogeneous ferrite films with a good property because of the crystallization of coated films or the residue of inorganic impurity during coating of the solution. In other words, relatively large crystals are roughly made so that constant thin films cannot actually be made.

SUMMARY OF THE INVENTION

An object of the present invention is to solve the above-mentioned problems and to provide the paste for ferrite that can produce a dense and homogeneous ferrite with a good property and can easily form ferrite thin films. A further object of the present invention is to provide the ferrite having a high-frequency property by coating and firing the paste.

In order to accomplish the above-mentioned objects, the paste for manufacturing ferrite of the present invention is produced by dissolving at least one component selected from the following group consisting of (A), (B) and (C) in organic solvent(D);

(A) organometallic compound having a metal element Fe;

(B) organometallic compound having at least one element selected from the group consisting of Mn, Li, Mg, Ni, Zn, Y, and Gd; and (C) at least one material selected from terpenoid carboxylic acid and resins containing the composition of the terpenoid carboxylic acid.

It is preferable in the above-mentioned paste for manufacturing ferrite that the mixing ratio of the components (A), (B), (C) and the organic solvent (D) is in the following range of parts by weight to 100 parts by weight of the entire composition;

(A) 0.1–20 parts by weight,
(B) 0.1–20 parts by weight,
(C) 20–50 parts by weight, and
(D) 40–75 parts by weight.

It is preferable in the above-mentioned paste for manufacturing ferrite that the component (A) comprises at least one organometallic compound selected from the group consisting of iron octylate, iron naphthenate, iron alkoxide having an alkoxyl group with 1–4 carbon atoms, and iron acetylacetonate.

It is preferable in the above-mentioned paste for manufacturing ferrite that the component (B) comprises at least one organometallic compound selected from the group consisting of metal octylate, metal naphthenate, metal alkoxide having an alkoxyl group with 1–4 carbon atoms, and metal acetylacetonate complex.

It is preferable in the above-mentioned paste for manufacturing ferrite that the component (C) comprises at least one compound or a composition selected from the group consisting of abietic acid, dihydoroabietic acid, abietic acid anhydride, dextropimaric acid and a mixture of the acids, and a rosin having a composition of ester of the acids.

It is preferable in the above-mentioned paste for manufacturing ferrite that the organic solvent (D) comprises at lease one material selected from the group consisting of acetone, methyl isobutyl ketone, cyclohexanone, ethanol, isopropanol, butanol, α-terpineol, benzene, toluene and xylene.

It is preferable in the above-mentioned paste for manufacturing ferrite that the component (B) is the organometallic compound comprising at least one element selected from the group consisting of Mn, Li, Mg, Ni and Zn; and the paste is used for manufacturing a spinel ferrite.

It is preferable in the above-mentioned paste for manufacturing ferrite that the component (B) is the organometallic compound comprising at least one element selected from the group consisting of Y and Gd, and the paste is used for manufacturing a garnet ferrite.

It is preferable in the above-mentioned paste for manufacturing ferrite that the mixing ratio of Fe of the component (A) to Me (Me herein denotes any of the metal elements of (B)) of the component (B) is 2–19:1 based on the atomic number ratio.

It is preferable in the above-mentioned paste for manufacturing ferrite that the mixing ratio of Fe of component (A) to Me (Me herein denotes any of the metal elements of (B)) of the component (B) is 5:3 based on the atomic number ratio.

It is preferable in the above-mentioned paste for manufacturing ferrite that the mixing ratio of Y of the organometallic compound (b1) to Gd of the organometallic compound (b2) is 3–X:X (provided X ranges from 0.5 to 2.4) based on the atomic number ratio.

It is preferable in the above-mentioned paste for manufacturing ferrite that an organometallic compound (component (E)) including Al is additionally used.

It is preferable in the above-mentioned paste for manufacturing ferrite that the mixing ratio of Fe of the component (A) to Al of the component (E) is 2.5–100:1 based on the atomic number ratio.

It is preferable in the above-mentioned paste for manufacturing ferrite that the component (E) is at least one organometallic compound selected from the group consisting of aluminum octylate, aluminum naphthenate, aluminum alkoxide having an alkoxyl group with 1–4 carbon atoms, and aluminum acetylacetonate.

It is preferable in the above-mentioned paste for manufacturing ferrite that the mixing ratio of the organometallic compound (A) and (B) ((A)+(B)) to the resin component (C) is $1\times10^{-4}$–$1\times10^{-3}$ mol/g.

It is preferable in the above-mentioned paste for manufacturing ferrite that the mixing ratio of the organometallic compound (A), (B), and the organic solvent (E) ((A)+(B)+ (E)) to the resin component (C) is $1\times10^{-4}$–$1\times10^{-3}$ mol/g.

It is preferable in the above-mentioned paste for manufacturing ferrite that the mixing ratio of the organometallic compound to the resin component (C) is $2\times10^{-4}$–$4\times10^{-4}$ mol/g.

It is preferable in the above-mentioned paste for manufacturing ferrite that 1–3 times as much organic solvent (D) as resin component (C) is contained.

It is preferable in the above-mentioned paste for manufacturing ferrite that the viscosity of the paste is 10–30 Pa.s.

According to another aspect of the present invention, there is provided a ferrite whose average particle size is 10–50 nm, produced by firing the above-mentioned paste.

The paste for manufacturing ferrite of the present invention is produced by dissolving the organometallic compound having a metal element Fe (A), organometallic compound having a metal element Me (Me herein denotes at least one element selected from the group consisting of Mn, Li, Mg, Ni, and Zn) (B) and at least one material selected from terpenoid carboxylic acid and resins containing the composition of terpenoid carboxylic acid (C) in the organic solvent (D). Unlike the prior method of obtaining the ferrite by dissolving nitrate or chloride in an organic solvent such as alcohol and then coating the solution on the substrate and firing thereon, the use of the method of the present invention provides films that are amorphous at the molecular level, because the paste without including inorganic metal compound such as metal nitrate or metal chloride is used. Thus, there is no fear that the relatively large crystal is roughly formed. Furthermore, neither crystallization nor aggregation occurs before firing the coated films. Therefore, since the paste comprises at least one material selected from the group consisting of terpenoid carboxylic acid and resins containing the composition of the terpenoid carboxylic acid (C), the paste is gradually decomposed through the state of carbon-rich precursor films. As a result, a dense and homogeneous ferrite with good a property is formed at a low temperature. The paste is an amorphous material in which the elements are combined homogeneously so that the paste can be coated thinly on the substrate by the printing method or the dip method or the spincoat method. Furthermore, the ferrite thin films can be produced by firing the coated thin film. As explained above, since neither crystallization nor aggregation in the paste occurs before firing the coated film, a thin film in which ferrite fine grains whose average particle size is 10–50 nm are densely combined can be provided. Therefore, the ferrite thin films can easily be formed from the paste. The ferrite with small particle size permits the production of magnetic material with a good high-frequency property. Consequently, such ferrite thin films are excellent for high-frequency devices such as isolators and circulators. Moreover, the ferrite thin films can easily be obtained by the simple method of coating the paste on the substrate and firing thereon. Thus, there is no need to use the complicated and time-consuming method where the sputtering apparatus or the like are used. The paste containing this composition is preferable for manufacturing the spinel ferrite. By the use of this type of paste, firing at lower temperature is possible. Therefore, if the ferrite with high saturation magnetization is needed, this paste is preferably used. Hereafter, this type of paste may be called the paste for spinel ferrite for short.

Moreover, in the case of using the paste for manufacturing ferrite of the present invention, which is produced by dissolving the organnometallic compound having metal element Fe (A), the organometallic compound having metal element Me (Me herein denotes at least one element selected from the group consisting of Y and Gd) (B) and at least one material selected from the group consisting of terpenoid carboxylic acid and the resin component containing the composition of terpenoid carboxylic acid (C) in the organic solvent (D), the similar preferable ferrite can be provided through the same operation as mentioned above. The paste containing this composition is preferable for manufacturing the garnet ferrite, which can provide a preferable paste with little loss in the region of high-frequency, especially in the region of micro wave. Hereinafter, this type of paste maybe called the paste for garnet ferrite for short.

According to the preferable example in producing the paste for garnet ferrite of the present invention in which the organometallic compound having a metal element Y (b1) and the organometallic compound having a metal element Gd (b2) are the main components of the organometallic compound (B), there can be provided a paste which permits improving a temperature property of the saturation magnetization.

According to the preferable example in producing the paste for the spinel ferrite of the present invention in which the mixing ratio of Fe of the component (A) to Me (Me herein denotes at least one metal element selected from the group consisting of Mn, Li, Mg, Mi, and Zn) of the component (B) is 2–19:1 based on the atomic number ratio, there can be provided a paste which exhibits an excellent property as a spinel ferrite.

According to the preferable example in producing the paste for the garnet ferrite of the present invention in which the mixing ratio of Fe of the component (A) to Me (Me herein denotes at least one metal element selected from the group consisting of Y and Gd) of the component (B) is 5:3 based on the atomic number ratio, there can be provided the paste which exhibits a excellent property as a garnet ferrite.

According to the preferable example in producing the paste for garnet ferrite of the present invention in which the mixing ratio of Y of the organometallic compound (b1) to Gd of the organometallic compound (b2) is 3–X:X (provided X ranges from 0.5 to 2.4) based on the atomic number ratio, there is provided a ferrite which is improved in the saturation magnetization and in the temperature property. In other words, there is provided a garnet ferrite at temperatures from $-30°$ to $-70°$ C., which is a practical temperature. Moreover, the garnet ferrite provided herein has a property in which a temperature change of the saturation magnetization is small.

According to the paste for manufacturing ferrite of the present invention as mentioned in any of the above, the saturation magnetization can be decreased by mixing an organometallic compound having the metal element Al (E).

Furthermore, according to the preferable example in producing the paste for ferrite of the present invention in which the mixing ratio of Fe of the organometallic compound (A) to Al of the organometallic compound (E) is 2.5–100:1 based on the atomic number ratio, there can be provided the ferrite which permits retaining the coercive force and decreasing the saturation magnetization.

Hereinafter, organometallic compound (P) will be used as a general name of the organometallic compounds (A), (B), and (E).

According to the preferable example of the above-mentioned paste for manufacturing ferrite of the present invention in whcih the mixing ratio of the organometallic compound (P) to the resin component (C) is $1\times10^{-4}$–$1\times10^{-3}$ mol/g (more preferably the ratio is $2\times10^{-4}$–$4\times10^{-4}$ mol/g), there can be provided the paste that permits easily resolving the following problems: if the ratio of the organometallic compound (P) is too small in the paste, when ferrite thin films are produced by firing the paste, obtaining the constant thin films is difficult; and if the organometallic compound (P) is too much in the paste, gas cannot vent out during the process of firing and decomposing the paste into the ferrite, causing cracks in the ferrite.

According to the preferable example in producing the paste for manufacturing ferrite of the present invention in which the viscosity of the paste is 10–30 Pa.s, there can be provided the paste which is preferable for printing such as screen printing.

The ferrite whose average particle size is 10–50 nm produced by firing the paste of the present invention as mentioned in any of the above has a small coercive force and little loss in the region of high-frequency. Furthermore, since the average particle size of the paste is fine, dense and homogeneous ferrite thin films can be obtained.

DETAILED DESCRIPTION OF THE INVENTION

Figure 1:
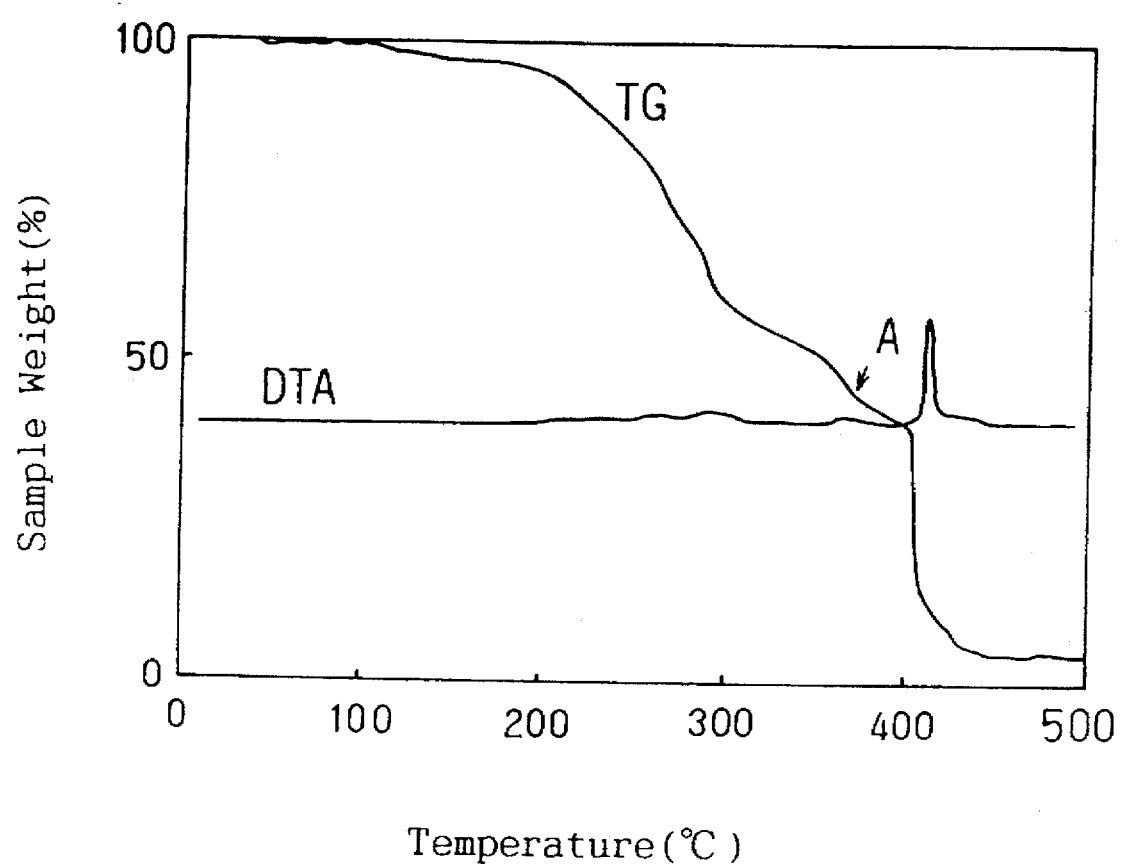
FIG. 1 is a TG/DTA curve showing the process of the thermal decomposition of the organometallic paste of the first embodiment.

Organometallic compounds having 1–10 carbon atoms that are easy to dissolve in the solvent are preferably used for the organometallic compound having a metal element Fe (A), for the organometallic compound having a metal element Me (Me herein denotes at least one element selected from the group consisting of Mn, Li, Mg, Ni and Zn) (B1), for the organometallic compound comprising a metal element Me (Me herein denotes at least one element selected from the group consisting of Y and Gd) (B2), and for the organometallic compound having a metal element Al (E).

More specifically, for the organometallic compounds, various carboxylic acids such as metal octylate, metal naphthenate, metal alkoxide having an alkoxyl group with 1–4 carbon atoms, and acetylacetonato complex are used.

The mixing ratio of the organometallic compound (A) to the organometallic compound (B1), the mixing ratio of the organometallic compound (A) to the organometallic compound (B2), and the mixing ratio of these compound to the additional organometallic compound (E) are explained above.

Specific examples of the material selected from terpenoid carboxylic acid or resins containing the composition of the terpenoid carboxylic acid (C) to be used for manufacturing the paste of the present invention are: abietic acid, dihydroabietic acid, dehydro abietic acid, anhydrous abietic acid, dextropimaric acid, the mixture of the acids, and a rosin having a composition of ester of the acids.

For the organic solvent to be used for the paste of the present invention, any solvent that can dissolve the organometallic compound (P) and the material selected from terpenoid carboxylic acid and the resin component containing a composition of terpenoid carboxylic acid (C) and put them into a paste-like state can be used. In other words, no special materials are required for the solvent. Although the organic solvent (D) varies depending on the type of the organometallic compounds (P) or the resin components (C), the following organic solvents are preferably selected: ketone group solvent such as acetone, methyl isobutyl ketone; alcohol solvent such as ethanol, α-terpineol; other solvent such as ether or benzene. In case of coating the paste on the substrate by the printing method, α-terpineol which is slow to evaporate is preferably used. In case of coating the paste on the substrate by the spincoat method or the dip method, methyl isobutyl ketone, which evaporates quickly, is preferably used.

The amount of the solvent (D) varies depending on the uses of the paste, the types of the organometallic compounds (P) or the resin components (C), and the methods for coating paste on the substrate so that the amount can not generally be pre-determined. However, as mentioned above, it is preferable that the amount of solvent (D) is 1–3 times as much by weight than that of resin component (C). Referring to details, it is preferable in the process of forming the paste that α-terpineol or the like that are slow to evaporate are used for the organic solvent (D). At this time, further preferably, the ratio of α-terpineol of organic solvent (D) to resin component (C) is 0.5–2:1 based on the weight ratio, then the organic solvent (D) may be added according to the purpose of the use as follows. In the case of applying the printing method, it is preferable that α-terpineol or the like that is slow to evaporate is added in the amount of the from 0 wt % and more than 0 wt % less than 15 wt % and the viscosity of the paste is adjusted. In the case of applying the dip method or the spincoat method, it is preferable that methyl isobutyl ketone or the like that is fast to evaporate is added in the amount of 50–200 wt % of the resin component and the viscosity of the paste is adjusted.

It is preferable that the viscosity of the paste is adjusted according to the coating methods as mentioned above. It is preferable that: when coating by the printing method, the viscosity is 10–30 Pa.s; when coating by the spincoat method or the dip method, the viscosity is $2 \times 10^{-2}$–$4 \times 10^{-2}$ Pa.s.

When coating the paste of the present invention on the substrate and firing thereon, any smooth substrates that are free from deformation or chemical change due to the firing temperature can be used. The appropriate substrate maybe selected according to the purpose of the use. The examples of such substrate materials include quartz, silicon wafer, ceramic monocrystal wafer or the like. Boro-silicate glass substrate (e.g. #7059 by Corning) or a quartz substrate containing little alkali ion that is easy to diffuse are preferably used.

The firing temperature of the paste also varies depending on the type of the organometallic compound (P) and the resin components (C) and the types of the substrates. However it is preferable that the firing temperature is raised to 500°–1000° C. finally. In particular, in order to strengthen an adhesion between the paste and the substrate, although the temperature varies depending on the type of substrates, it is preferable that the paste is fired at temperatures above 600° C. The ferrite produced from the paste of the present invention can be made at lower temperatures as compared to the prior powder method. Consequently, the method permits saving in thermal energy. Thus, when forming thin films by coating paste on the substrate, the substrate with lower heat-resistance may be used. Moreover, the paste for the spinel ferrite has a merit of firing at a lower temperature than the paste for the garnet ferrite, because the spinel ferrite can form crystals at a lower temperature.

As explained above, the use of the simple method of firing the paste of the present invention permits easily obtaining the ferrite having little coercive force and little loss in the region of high-frequency. As a result, ferrite thin films with the same property can be easily produced from such ferrite. The reason why the ferrite with the excellent property can be obtained is that the ferrite has a structure in which fine grains whose average particle size is 10–50 nm are combined densely and homogeneously. As a result, the ferrite thin films also become dense and homogeneous when thin films are formed from the ferrite of the present invention.

The invention will be explained in detail with reference to the attached figures and following examples. The examples are illustrative and should not be construed as limiting the invention in any way.

EXAMPLE 1

An organometallic paste was produced by following the steps of: preparing 10 grams of octylic acid in which iron octylate (iron content is 11.5 wt %), nickel octylate (nickel content is 17.0 wt %) and zinc octylate (zinc content is 18.6 wt %) were mixed at the molar ratio of 4:1:1; dissolving the above-mentioned octylic acid in 100 grams of the organic solvent α-terpineol and making a solution; adding 100 grams of rosin in the solution; and stirring the solution at a temperature of 160° C. until melted. The rosin is the mixture of terpenoid carboxylic acid and its ester component, or the composition of terpenoid carboxylic acid or its ester component. The reason for using the rosin as the resin component was that rosin has the carboxyl group (—COOH) from which the metallic salt can be easily made and also can efficiently dissolve organometallic materials. Moreover, the reason for heating at a temperature of 160° C. was to improve the dissolution property and chemical reaction below the decomposition temperature of the organometallic material (the temperature of carboxylic acid is 200°–400° C.).

The viscosity of the organometallic paste can properly be adjusted by changing the amount of α-terpineol to be added. Since the viscosity of the paste of the present invention was 27 Pa.s, in order to produce the paste for printing, the viscosity was adjusted to 18 Pa.s by adding α-terpineol in an amount of 3 wt % more. Moreover, the ferrite thin films were produced by the following steps of: coating the paste on the boro-silicate glass substrate (e.g.) #7059 by Corning) by the screen-printing method; and then firing the coated paste in the air at a temperature in the range of 500°–800° C. The reason for determining the firing temperature above 500° C. was that the decomposition termination temperature (a temperature at which the organometallic compound is decomposed into the metal oxide) measured by an apparatus for differential thermal analysis was 450° C.

In order to evaluate the property of the film, two coating liquids were prepared. One coating liquid (concentration was $3.5 \times 10^{-4}$ mol/g) was produced by dissolving iron octylate, nickel octylate, and zinc octylate in 4-methyl-2-amyl alcohol in the same molar ratio; and another coating liquid (concentration was $3.5 \times 10^{-4}$ mol/g) was produced by dissolving iron nitrate, nickel nitrate and zinc nitrate in ethanol in the same ratio. Both of these coating solutions were coated on the substrate by the spincoat method and fired at the same temperature. Each of them was called respectively comparative example 1 and comparative example 2.

When the X-ray diffraction pattern of the thin film was taken, a peak of the monolayer of NiZn ferrite (spinel-formation crystal structure) was observed at the firing temperatures above 600° C. The temperature was a few hundred degrees lower than that of the general ceramic powder process. It is thought that this occurs because each metal element was combined homogeneously at the element level. The saturation magnetization per unit volume (hereinafter the saturation magnetization is shown by per unit) measured by the use of vibration sample magnetmeter (VSM) almost agreed with that of polycrystalline bulk materials containing the same composition, which were produced with the powder of $Fe_2O_3$, NiO, ZnO by the dry method. Thus, the dense NiZn ferrite thin films were observed to be formed. When the surface and profile of the ferrite films were observed through the scanning electron microscope, the structure comprising fine grains of 10–20 nm particle size was recognized. Furthermore, when the fine grains were analyzed through the transmission electron microscope, each of the fine grains turned out to have a monocrystal structure.

According to the same analysis of the comparison example 2, the monolayer of NiZn ferrite was similarly formed. However, fine grains of 50–200 nm with many air gaps were produced, and the saturation magnetization was also smaller by 30%. Meanwhile, although the comparison example 1 had a structure in which fine grains of NiZn ferrite of 40–60 nm were relatively densely combined, the saturation magnetization was smaller by 10%. Thus the density is also believed to be smaller than the ferrite thin films of the present invention.

The reason why the films of the present invention had a structure in which fine grains were closely combined can be explained as follows.

In order to produce inorganic solid films, especially dense and homogeneous thin films, by the coating and firing of the liquid, crystallization and aggregation of the coated films before firing must be avoided. For example, films are not produced by coating an aqueous solution of sodium chloride on a substrate and drying thereon. Such a result tended to be obtained when a solution of inorganic salt of the comparison example 2 was coated. In such cases, a relatively large crystal was roughly produced.

In the case of using the organometallic paste of the comparison example 1, amorphous coated films were produced and crystallization and aggregation of the coated films were not observed. As a result, continuous homogeneous oxide thin films could be obtained by firing the coated films. Moreover, when the organometallic paste of the present invention was used, thin films with a high density and small particle size were obtained. The reason for this is believed to be as follows: the paste of the present invention contains the resin component so that the paste is organic; the films containing the dense and continuous carbon-rich composition were produced from the above-mentioned paste during formation of oxide; and the frame of the oxidation films (in other words, the structure comprising non-fixed carbon surrounding fine grain of oxide of Fe, Ni, and Zn, and C═O radicals combined with the oxide of Fe, Ni, and Zn) was made from the carbon-rich paste. Additionally, such composition was thought to prevent the grains from growing. FIG. 1 is a result of the differential thermal analysis (TG/DTA curve) of the powder produced by drying the organometallic paste of the present invention. When analyzing the film at Point A before termination of the decomposition by use of the Fourier infrared spectrophotometer, C═O radicals were observed. This is believed to be the basic structure of a carbon-rich film. But, every resin component is not efficient. The resin component of ethyl cellulose used for an inorganic powder paste with a large molecular weight is easy to polymerize and forms strong carbon-rich films which are easy to drop off from the substrate during the process of firing. Such materials turned out to be unpreferable. It is necessary to use the material selected from either terpenoid carboxylic acid or resins containing the composition of terpenoid carboxylic acid (C).

The above-mentioned TG/DTA denotes the Thermal Gravity Analysis/Differential Thermal Analysis. The Thermal Gravity Analysis is an analysis for measuring a change in the weight with rising temperature of the sample. Meanwhile, the Differential Thermal Analysis is an analysis of measuring a differential value of the temperature of the sample, which permits analyzing at what temperature a chemical reaction will occur and furthermore whether the chemical reaction is an endothermic reaction or an exothermic reaction. FIG. 1 illustrates both these curves in one figure. The percentage of the sample weight shown in the vertical axis shows a value when the entire value is 100%. The decrease of the sample weight at the temperature about 200° C. in the TG-curve reflects the evaporation of the solvent (in this case the solvent is α-terpineol). The decrease of the sample weight at a temperature in the range of 200°–400° C. is attributed to gradual evaporation of the resin component. As obviously shown in the peak of the DTA-curve (the graph being upwardly convex means the exothermic reaction); the sudden chemical reaction occurred at a temperature of 420° C. and the chemical reaction stopped and oxide was produced at a temperature around 450° C. At the point A, just before the radical chemical reaction, when analyzing the sample after the temperature stopped rising, C=O combination was observed as mentioned above.

The magnetic property will now be explained. The magnetic permeability was measured by the figure-eight coil method, the coercive force was measured by a vibration sample magnetmeter(VSM), and a gyromagnetic resonance line width was (hereafter representing the gyromagnetic resonance line width by $\Delta H$) measured by a ferronagbetic resonance of a stripline.

The magnetic permeability of the NiZn ferrite film of the present invention was 60 (1 MHz–100 MHz), the coercive force was 0.8 Oe. According to the comparison example 1, the magnetic permeability was 50 and the coercive force was 2 Oe. According to the comparison example 2, the magnetic permeability was 30 and the coercive force was 7 Oe. The results were inferior to those of the present invention. It is believed to reflect the homogeneity of films.

At 10 GHz, the $\Delta H$ of NiZn ferrite film of the present invention was 15 Oe, which was about one-tenth of that of the general NiZn ferrite film produced by the ceramic process. Generally, the crystals bind through the interaction in which the elements between crystals in ferrite films exchange. However, if the magnetic body was produced at much smaller crystal order than that from the above-mentioned binding of the interaction, the apparent crystal magnetic aeolotropy was recognized to decrease (IEEE Trans. Magn. MAG-26, pp1937–1402). The NiZn ferrite film of the present invention has a structure from sintering the very fine crystal grain, and the apparent crystal magnetic aeolotropy is thought to be very small. The $\Delta H$ was in proportion to the constant of crystal magnetic aeolotropy and a hole ratio. The hole ratio was not so different from the saturation magnetizations. Therefore, the reason why the $\Delta H$ was much smaller than that of bulk materials was that the ferrite of the present invention comprised 10–20 nm fine crystal grains. The films of the present invention had small $\Delta H$, which is the excellent property for the micro wave materials. As a result, the film of the present invention is useful for magnetic thin film materials.

EXAMPLE 2

An organometallic paste was produced by the following steps of: preparing 10 grams of octylate acid in which yttrium octylate (yttrium content is 17.1 wt %) and iron octylate (iron content is 11.5 wt %) were mixed at the molar ratio of 3:5; dissolving the above-mentioned octylic acid in 100 grams of the organic solvent, α-terpineol; adding 100 grams of resin of rosin family and making a solution; and stirring the solution at a temperature of 160° C. until melting. The decomposition termination temperature determined by the TG/DTA curve of the paste was 430° C. Additionally, the coating liquid for spincoat with the viscosity of $3\times10^{-2}$ Pa.s was produced by adding 100 grams of 4-methyl-2-pentanone, which is a volatile solvent, into the paste.

The coating liquid was coated on the quartz substrate by the spincoat method and fired at a temperature of 500° C. in the air. After the above-mentioned operation was repeated ten times, the ferrite thin films were formed through a heat treatment at a temperature of 600°–1000° C. in the air. The thickness of the films was about 1 μm.

When the X-ray diffraction pattern of the film of the present invention was measured, a peak of the monolayer of YIG (garnet-type crystal structure) was observed at temperatures above 800° C. The temperature of forming films was 600° C. lower than that of the general ceramic powder process. It is believed that this occurs because the metal element was mixed homogeneously at an element level. The saturation magnetization measured by the VSM almost agreed with that of the YIG produced from the oxide powder materials ($Fe_2O_3$ and $Y_2O_3$) by the dry method. The dense YIG thin films were observed to be formed. When the surface and profile of the ferrite films were observed through the scanning electron microscope, the structure comprising fine grains of 20–30 nm were recognized. Moreover, when the fine grains were analyzed through a transmission electron microscope, each of the fine grains turned out to have a monocrystal structure.

The magnetic property of micro wave will now be described. The measurement of $\Delta H$ was the same as in example 1.

At 10 GHz, the $\Delta H$ of the NiZn ferrite film was 4 Oe, which was about one-tenth of monocrystal YIG thin films produced by the general ceramic powder process. The YIG thin films of this example were also formed of 20–30 nm fine crystal grains, which was same as example 1, so that the $\Delta H$ is thought to be small.

According to the example, the paste was coated by the spincoat method. However, it is possible to print the desired pattern by adjusting the viscosity of the paste and applying the screen printing method. One of the features of the present invention is forming the pattern directly by a printing method such as a screen printing method or the like.

EXAMPLE 3

An organometallic paste was produced by the following steps of: preparing 10 grams of octylic acid in which iron octylate (iron content is 11.5 wt %), manganese octylate (manganese content is 16.1 wt %) and aluminum octylate (aluminum content is 6.0 wt %) were mixed at the molar ratio of 4:1:1; dissolving the above-mentioned octylic acid in 100 grams of the organic solvent, α-terpineol; adding 100 gram of the resin of rosin family to the solution; and stirring the solution at a temperature of 160° C. until melted.

Since the viscosity of the paste of the present invention was 27 Pa.s, in order to produce the paste for printing, the viscosity was adjusted to 18 Pa.s by adding 3 wt % more α-terpineol. Moreover, the ferrite thin films were produced by coating the paste on the boro-silicated glass substrate (#7059, by Corning) by the screen printing method and then firing the coated paste in the air at a temperature in the range of 500°–800° C. The reason for determining the firing temperature above 500° C. was that the decomposition termination temperature (the temperature at which the organometallic compound is decomposed into the metal oxide) measured by the apparatus for differential thermal analysis was 420° C.

When the X-ray diffraction pattern of the thin film was measured, a peak of the monolayer of the NiZn ferrite (spinel-type crystal structure) was observed at the firing temperature above 600° C. The temperature was a few hundred degrees lower than that of the general ceramic powder process as in example 1 and 2. Moreover, the saturation magnetization measured by VSM almost agreed with monocrystal bulk materials. The dense MnZn ferrite films were recognized to be formed. When the surface and profile of the ferrite films were observed through the scanning electron microscope, the structure comprising fine grains of 10–20 nm was observed. Moreover, when the grains were analyzed through the transmission electron microscope, each of the fine grains turned out to have a monocrystal structure.

The magnetic property will now be described. The measurement of $\Delta H$ was the same as Example 1.

The magnetic permeability of the MnZn ferrite film was 800 (0.1 MHz–2 MHz), the coercive force was 0.8 Oe, and the relative loss factor (tan $\delta/\mu$) at 1 MHz was $7 \times 10^{-6}$. The relative loss factor was about from half to one-third of the monocrystal MnZn ferrite with same magnetic permeability that was produced by the general dry powder method. It is believed because the crystal grain size was small so that eddy current loss was also small.

As explained above, the dense and homogeneous ferrite thin films could be obtained by coating and firing the organometallic paste of the present invention. And such ferrite thin film is formed by small particles so that the ferrite film is excellent in high-frequency property.

EXAMPLE 4

An organometallic paste was produced by the following steps of: preparing 10 grams of octylic acid in which yttrium octylate (yttrium content is 17.1 wt %), aluminum octylate (aluminum content is 6.0 wt %) and iron octylic acid (iron content is 11.5 wt %) were mixed at the molar ratio of 3.0:0.5:4.5; dissolving the above-mentioned octylate in 100 grams of the organic solvent α-terpineol; adding 100 grams of the resin containing a rosin component to the solution; and stirring the solution at a temperature of 160° C. until melted. The decomposition termination temperature determined by the TG/DTA curve was 430° C. Additionally, the coating liquid for spincoat with the viscosity of $3 \times 10^{-2}$ Pa.s was produced by adding 100 grams of 4-methyl-2-pentanone, which is a volatile solvent, into the paste.

The coating liquid was coated on the quartz substrate by the spincoat method and fired at a temperature of 500° C. in the air. After the above-mentioned operation was repeated ten times, the ferrite thin film was formed through the heat treatment at a temperature of 600°–1000° C. The thickness of the film was about 1 μm.

When the X-ray diffraction pattern of the film of the present invention was measured, a peak of the monolayer of YIG (garnet type crystal structure) was observed at temperatures above 800° C. This shows that element of Al substituted for Fe in YIG. The temperature of forming films was 600° C. lower than that of the general ceramic powder process. It is believed that this occurs because the metal element was mixed homogeneously at the element level. The saturation magnetization measured by the VSM was almost half of YIG. This occured because Al was substituted for Fe having a magnetic property. The saturation magnetization almost agreed with the Al-substituted YIG thin film of the same composition that was produced by the dry powder process. The dense Al-substituted YIG thin films turned out to be formed. When the composition of the Al-substitution YIG was represented herein $Y_3Fe_{5-x}Al_xO_{12}$, the saturation magnetization could be adjusted in the range from 141 emu/cc to 24 emu/cc by adding Al so as to change X in the range of 0–1.2. When the surface and profile of the ferrite films were observed through the scanning electron microscope, the structure comprising fine grains of 10–20 nm was recognized. Furthermore, when the fine grain was analyzed through the transmission electron microscope, each of the fine grains turned out to have a monocrystal structure.

The magnetic property of the microwave will now be explained. The measurement of $\Delta H$ is same as the example 1.

The $\Delta H$ of YIG thin film of the present invention measured at 10 GHz was 5 Oe, which was about one-tenth of the monocrystal YIG produced by the general ceramic powder process. The Al-substituted YIG thin film of this example was also formed by 20–30 nm fine crystal grains, which was same as example 1, so that the $\Delta H$ was believed to be small.

According to the example, the paste was coated by the spincoat method. However, it is possible to print the desired pattern by adjusting the viscosity of the paste by using the screen printing method.

EXAMPLE 5

An organometallic paste was produced by the following steps of: preparing 10 grams of octylic acid in which yttrium octylate (yttrium content is 17.1 wt %), gadolinium octylate (gadolinium content is 26.8 wt %) and iron octylate (iron content is 11.5 wt %) were mixed at the molar ratio of 1.2:1.8:5.0; dissolving the above-mentioned octylate in 100 grams of the organic solvent α-terpineol; adding 100 grams of resin having a rosin component and making a solution; and stirring the solution at a temperature of 160° C. until melting. The decomposition termination temperature which was determined by the TG/DTA curve was 430° C. Additionally, the coating liquid with the viscosity of $3 \times 10^{-2}$ Pa.s was produced by adding 100 grams of 4-methyl-2-pentanone, which is a volatile solvent, into the paste.

The coating liquid was coated on the quartz substrate by the spincoat method and fired at a temperature of 500° C. in the air. After the above-mentioned operation was repeated ten times, the ferrite thin film was formed through the heat treatment at a temperature of 600°–1000° C. The thickness of the film was about 1 μm.

Figure 2:
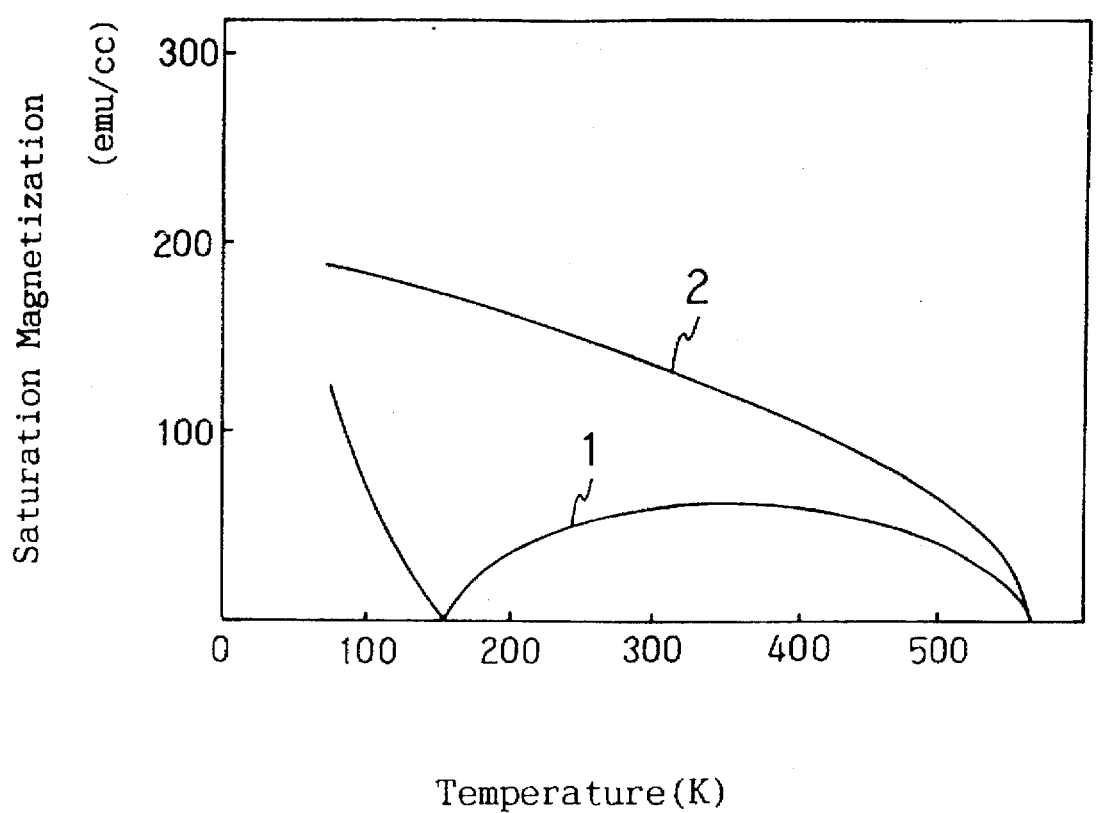
FIG. 2 is a graph showing the temperature property of saturation magnetization of YIG (YIG is short for yttrium iron garnet or a kind of garnet ferrite) thin film and Gd substitution YIG thin film.

When the X-ray diffraction pattern of the film of the present invention was measured, a peak of the monolayer of garnet-type crystal structure was observed at temperatures above 800° C. This shows that Gd was substituted for Y in YIG. The temperature of forming film was 600° C. lower than that of general ceramic powder method. It is thought that this occured because the metal elements were mixed homogeneously at an element level. The saturation magnetization measured by the VSM was almost half that of the YIG. This occured because Al was substituted for Fe. The saturation magnetization measured by the VSM was almost that found with Al-substituted YIG containing the same composition which was produced by the dry powder method. The dense Gd-substituted YIG thin films turned out to be formed. The temperature property of saturation magnetization was shown in the curve 1 of the FIG. 2. For comparison, the temperature property of example 2 was also shown by the curve 2 of the FIG. 2. As clearly shown in FIG. 2, the saturation magnetization of the YIG gradually decreased according to the rise of a temperature and finally became 0 at a temperature of 570K. Meanwhile, Gd-substituted YIG showed 0 at 160K, and then rose and showed 0 at the same temperature as the YIG. This was the phenomenon caused by balancing the magnetization of Gd and Fe, because each magnetization had reverse direction to each other and the temperature property was different. As clearly shown in FIG. 2, the change in temperature of the Gd-substitution YIG was small at the magnetization around the room temperature (i.e. 300K=27° C.) as compared to the YIG shown in the curve 2. When the composition of the Gd-substituted YIG is represented as $Y_{3-x}Gd_xFe_5O_{12}$, in order to decrease the change in the temperature of the magnetization around the room temperature, it is preferably that Gd is substituted in the range from X=0.5 to X=2.4. When the surface and profile of the ferrite films were observed through the scanning electron microscope, the structure comprising 10–20 nm of fine grain were recognized. Moreover, when the grains were analyzed through the transmission electron microscope, each of the fine grains turned out to have a monocrystal structure.

The magnetic property will now be described. The measurement of the ΔH was the same as Example 1.

The ΔH of YIG thin film of the present invention measured at the 10 GHz was 9 Oe, which was about one-tenth of a monocrystal YIG produced by the general ceramic powder process. The Gd substituted YIG thin film of this example was also formed by fine grains of 20–30 nm, which was same as example 1, so that the ΔH is thought to be small.

According to the example, the paste was coated by the spincoat method. However, it is also possible to print the desired pattern by adjusting the viscosity of the paste and using the screen-printing method.

According to the above mentioned examples 1–5, although the octylate was used for the organometallic, any organometallic that is stable and can be dissolved by the less volatile solvent such as α-terpineol may be used for producing the ferrite paste.

In order to control the property, the paste for ferrite can also be produced by adding the organometallic having a metal element other than Ni, Zn, Mn, and Y.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, and all changes which come within the meaning and range of equivalency of the claims are intended to be embraced therein.

We claim:

1. A paste for manufacturing ferrite which is produced by dissolving at least one component selected from each of the following groups of (A), (B), and (C) in an organic solvent (D):

(A) organometallic compound having a metal element Fe;

(B) organometallic compound having at least one element selected from the group consisting of Mn, Li, Mg, Zn, Y, and Gd; and (C) at least one material selected from terpenoid carboxylic acid and resins containing terpenoid carboxylic acid, wherein the added amounts of components (A), (B), (C) and organic solvent (D) are in the following range of parts by weight to 100 parts by weight of the whole composition:

(A) 0.1–20 parts by weight,
(B) 0.1–20 parts by weight,
(C) 20–50 parts by weight, and
(D) 40–75 parts by weight.

2. The paste for manufacturing ferrite according to claim 1, wherein the component (A) comprises at least one organometallic compound selected from the group consisting of iron octylate, iron naphthenate, iron alkoxide having an alkoxyl group with 1–4 carbon atoms, and iron acetylacetonate.

3. The paste for manufacturing ferrite according to claim 1, wherein the component (B) comprises at least one organometallic compound selected from the group consisting of metal octylate, metal naphthenate, metal alkoxide having an alkoxyl group with 1–4 carbon atoms, and metal acetylacetonato complex.

4. The paste for manufacturing ferrite according to claim 1, wherein the component (C) comprises at least one compound or composition selected from the group consisting of abietic acid, dihydoroabietic acid, abietic acid anhydride, dextropimaric acid and a mixture of the acids and rosin comprising an of ester of the acids.

5. The paste for manufacturing ferrite according to claim 1, wherein the component (D) comprises at least one solvent selected from the group consisting of acetone, methyl isobutyl ketone, cyclohexanone, ethanol, isopropanol, butanol, α-terpineol, benzene, toluene, and xylene.

6. The paste for manufacturing ferrite according to claim 1, wherein the component (B) is the organometallic compound comprising at least one element selected from the group consisting of Mn, Li, Mg, Ni and Zn; and the paste forms a spinel type ferrite upon firing.

7. The paste for manufacturing ferrite according to claim 1, wherein the compound (B) is the organometallic compound comprising at least one element selected from the group consisting of Y and Gd, and the paste forms a garnet type ferrite upon firing.

8. The paste for manufacturing ferrite according to claim 7, wherein the mixing ratio of Y to Gd is 3–X:X, wherein X ranges from 0.5 to 2.4.

9. The paste for manufacturing ferrite according to claim 7, further comprising an organometallic compound (E) whose metal element is Al.

10. The paste for manufacturing ferrite according to claim 9, wherein the mixing ratio of Fe of the component (A) to Al is 2.5–100:1.

11. The paste for manufacturing ferrite according to claim 9, wherein the component (E) is an organometallic compound comprising selected from the group consisting of aluminum octylate, aluminum naphthenate, aluminum alkoxide having alkoxyl group with 1–4 carbon atoms, and aluminum acetylacetonate.

12. The paste for manufacturing ferrite according to claim 1, wherein the mixing ratio of organometallic compound (A) and (B) ((A)+(B)) to the resin component (C) is $1\times10^{-4}$–$1\times10^{-3}$ mol/g.

13. The paste for manufacturing ferrite according to claim 9, wherein the mixing ratio of organometallic compound (A), (B), and (E) ((A)+(B)+(E)) to resin component (C) is $1\times10^{-4}$ mol/g.

14. The paste for manufacturing ferrite according to claim 1, wherein the mixing ratio of organometallic compound to resin component (C) is $2\times10^{-4}$–$4\times10^{-4}$ mol/g.

15. The paste for manufacturing ferrite according to claim 1, wherein 1–3 times as much organic solvent (D) as resin component (C) is contained.

16. The paste for manufacturing ferrite according to claim 1, wherein a viscosity of the paste is 10–30 Pa.s.

17. The method of manufacturing ferrite thin film, wherein the paste according to claim 16 is coated on the substrate by the screen-printing method and then said coated film is fired thereon.

18. A ferrite having an average particle size of 10–50 nm, which is produced by firing the paste for manufacturing ferrite of claim 1.

* * * * *